United States Patent [19]
Bonhoure et al.

[11] Patent Number: 6,147,175
[45] Date of Patent: Nov. 14, 2000

[54] CROSSLINKED BIOLOGICAL PRODUCTS, PROCESS FOR OBTAINING SUCH PRODUCTS, AND THEIR USE AS REMOVERS

[75] Inventors: Jean-Paul Bonhoure, Saint-Prix; Jacques Doumeizel, Houdan; Denis Thery, Auvers-sur-Oise, all of France

[73] Assignee: Syndicat Interprofessionnel Biodecap, France

[21] Appl. No.: 09/194,384

[22] PCT Filed: Apr. 1, 1998

[86] PCT No.: PCT/FR98/00658

§ 371 Date: Nov. 19, 1998

§ 102(e) Date: Nov. 19, 1998

[87] PCT Pub. No.: WO98/44004

PCT Pub. Date: Oct. 8, 1998

[30] Foreign Application Priority Data

Apr. 1, 1997 [FR] France .................................... 97/03931

[51] Int. Cl.[7] ............................. C08B 31/00; C08B 33/00
[52] U.S. Cl. ................................. 526/238.2; 526/238.22; 536/102; 536/106; 536/124; 536/126; 127/32; 127/33; 127/38; 127/67; 127/70; 127/71
[58] Field of Search ........................... 526/238.2, 238.72; 536/102, 106, 124, 126; 127/32, 33, 38, 67, 70, 71

[56] References Cited

U.S. PATENT DOCUMENTS 5,066,335  11/1991  Lane et al. .................................. 134/7

FOREIGN PATENT DOCUMENTS

| 0396226 | 11/1990 | European Pat. Off. . |
| 94628 | 12/1896 | Germany . |
| 27993 | 5/1946 | Luxembourg . |
| 269496 | 10/1950 | Switzerland . |

*Primary Examiner*—Nathan M. Nutter
*Attorney, Agent, or Firm*—Bierman, Muserlian and Lucas

[57] ABSTRACT

The invention relates to the field of biological chemistry, and to polysaccharides in particular. Specifically, it concerns biological products obtained as a result of the polymerization and crosslinking in an alkaline medium of a gel, comprised of wheat or spelt wheat flour, in the presence of a dual-function crosslinking reagent. The invention further relates to a process for obtaining said biological products, consisting in forming an aqueous dispersion of flour, rendering this dispersion alkaline by adding an alkaline metal hydroxide, performing polymerization and crosslinking in the presence of a dual-function crosslinking reagent, and drying the resultant gel to obtain a vitreous, lightly colored product with a solid substance content of between 75% and 85% which is then ground into hard particles of a predetermined size. The application of the invention is abrasive particles.

21 Claims, 5 Drawing Sheets

Epichlorhydrin (E)

Maleic anhydide (MA)

Phthalic anhydride (PA)

Galacturonic acid (GA)

Formalin (F)   HCHO

Silicon tetrachloride (S)   $SiCl_4$

FIG. 9

CROSSLINKED BIOLOGICAL PRODUCTS, PROCESS FOR OBTAINING SUCH PRODUCTS, AND THEIR USE AS REMOVERS

This application is a 371 of PCT/FR98/00658 filed Apr. 1, 1998.

FIELD OF THE INVENTION

The present invention relates to the field of biological chemistry and to polysaccharides in particular.

It is more specifically directed to biological products derived from cereal flour and so processed to acquire a vitreous texture and enough hardness to be used as abrasive material.

The present invention hence deals with biological products resulting from polymerizing and crosslinking cereal flours by means of a divalent crosslinking agent.

DISCUSSION OF THE PRIOR ART

From French Patent N° 2 646 621, it has been known that vitreous polysaccharide particles can be obtained from starch. These particles have an apparent hardness intermediate the hardness of the coating to be abraded and the hardness of the substrate bearing said coating whereby selective abrasion is achieved.

These particles are formed of wheat starch which had been annealed beforehand to obtain a solid product having a moisture content in the range of 10 to 70% by weight, reacted mainly with epichlorhydrin as crosslinking agent to yield polysaccharide molecules having intermolecular chemical cross-linkages, and ground such that the resulting solid product forms granular particules of a specified particle size and displays hardness up to 4.0 Moh.

The granules described in the above mentioned patent are comprised of starch of well defined water content, which is amorphous in structure and contains little dextrose. The product has therefore undergone only minor hydrolysis in the course of different treatments in alkaline conditions.

It should also be noted that the crosslinking agent used in this process is one selected besides epichlorhydrin, among sodium tripolyphosphate or sodium trimetaphosphate.

Experimental trials conducted by the applicant have shown that epichlorhydrin is not an effective crosslinking agent because it does not increase the viscosity of the product disclosed in patent N° 2 646 621.

Another significant point is that wheat starch must be subjected to prolonged annealing to undergo complete gelatinization and then to full drying in an oven or extruder following crosslinking. There is obtained in this way a bulk product which becomes hard and glass-like upon cooling to room temperature.

The biological product which is disclosed in the present application hence differs from the one previously described in patent N° 2 646 621 in that it derives not from variably hydrolyzed starch but from flour, in that the crosslinking agent is not epichlorhydrin but is chosen among divalent crosslinking agents selected from the group of halogen-multisubstituted derivatives, aldehyde compounds, divalent aldehyde compounds, and dicarboxylic acid anhydrides, and in that the drying is performed not in an extruder having different heating portions or compartments but in an extruder or oven ensuring thorough drying without crust formation or, by contrast, without formation of products of too brittle a character.

All such differences result in the formation of a biological product the chemical and physical characteristics of which are quite distict from those disclosed in the pior art patent documents. Namely, whereas epichlorhydrin crosslinking generates ether linkages between individual chains of glucose molecules, the use of divalent derivatives such as formalin or maleic anhydride, leads to complex chemical reactions of a different type and is likely not lead to crosslinkage formation if at all.

In French Patent N° 2 250 851, there are disclosed paint coatings based on clay wherein crosslinking is carried out by formalin treatment with the aid of such an agent as a mixture of melamine-formalin. It is not clear in this reaction whether it is formalin or melamine which reacts with starch or whether both reagents react simultaneously. It can be questioned what sort of reaction is most likely to occur between starch anhydroglucose molecules and such a reagent.

As a matter of fact, the action of a crosslinking agent can lead either to ether bond formation on hydroxymethyl groups at position 6 of glucose units, or to intramolecular crosslinking reactions between individual straight chain polysaccharides. The actual crosslinking reagent used could favor either one of these reactions or by contrast have no specificity. Moreover, presence of protein in flour further results in more complex reactions due to intramolecular Maillard reaction.

SUMMARY OF THE INVENTION

It is an object of the present invention to provide a process for making such biological products, which consists in providing an aqueous dispersion of cereal flour, obtaining lo first by way of curing in an alkaline medium a gel from such flour, including wheat flour or spelt wheat flour, and subjecting the gel, in the presence of a crosslinking agent, to further curing in order to obtain in the course of gel aging a solid structure having a glass-like character followed by crushing or grinding to thereby obtain slightly colored, hard, translucent grains of amorphous structure.

DETAILED DESCRIPTION OF THE INVENTION

Flour Selection and Protein Influence

Elasticity and compressibility of the gel both depend on the type of flour used. For instance, in the case of cereal flour, elasticity is high and compressibility is poor whereas for potato flour, the opposite holds true. Thus, the source of flour confers to the gel a specific texture (elasticity, breakdown) while other properties of the gel relate to the starch content and gelling temperature, as well as to the flour/proteinlother ingredients ratio.

Protein whenever present result in better contact between granules and a consolidated molecular network. These interactions only occur with certain grades of flour (such as wheat), which contain "tacky materials" at grain joints. Protein trapped inside the network play a static role and confer a specific structure to the media. Protein contained in the composition greatly affect the effectiveness of the product.

Thus, in accordance with the invention, a series of trials has shown it was convenient to select a wheat flour which confers to the abrasive media:

the capacity to achieve, starting from the same raw material, different abrasive grades, unlike the use of starch alone, the capacity to obtain a product of higher durability, while retaining greater softness, allowing more extensive reuse of the product after blasting than standard products using the same blasting system and the same operating conditions. As a result, the thus obtained abrasive grit performs better and is less brittle when blasted.

efficiency from the first run, unlike standard products, while still being selective.

Selecting Crosslinking Agents

Given identical drying and gelling conditions, the type of crosslinking agent has a significant effect on hardness measurement. In fact, the abrasive material of the invention is harder than the standard product now available.

The crosslinking agents used must be divalent i.e. have two electron-rich functional groups (maleic anhydride, phthalic anhydride, glyoxal, glutaraldehyde). Other crosslinking agents may be used, such as e.g.

—$POCl_3$
$CH_3CHO$
formalin

| Media characteristics | |
| --- | --- |
| Particle size distribution: | 0.120 mm to 1.8 mm |
| Specific gravity (S.G.): | 0.75 to 0.85 |
| Shore index hardness: | 70 to 85 |

Raw materials to be used are preferably either animal feed or baker's wheat flour or spelt wheat flour having undergone no other treatment than grinding into flour.

According to this process, flour will go through five processing steps providing a cereal flour dispersion in water at room temperature, gelling under heating in an aqueous medium in the presence of an alkaline agent and a crosslinking agent until a homogeneous bulk product is obtained, drying of the gel in a thin layer reactor allowing helical motion of the mixture to promote rapid turnover of the surface being dried, stabilizing the gel for a time sufficient to insure uniform moisture content of the formed granules (tempering), grinding and sieving the dried gel to form hard particles of a predetermined particle size distribution.

In this particular embodiment, the crosslinking agent is chosen among twice chorine substituted derivatives and especially phosphorus oxychloride, aldehyde compounds like formaldehyde or acetaldehyde or maleic anhydride.

According to another particular embodiment of the invention, formalin treatment of the gel is conducted using an aqueous flour slurry. Raw flour concentration may vary to a great extent and will lie more especially in the range of 15 to 45% of total mass of the slurry. This procedure may be carried out in a glass or metal reactor being heated by an outer jacket and equipped with a stirring device of sufficient output. Stirring is aimed at obtaining a stable homogeneous texture following heating without causing gel disruption.

The reactor may further be fitted with a device for drying the gel in situ optionally by applying partial vacuum. The reactor may further be provided with a back-up external heating device such as a microwave oven.

Where drying is conducted outside the reactor, the latter will be further fitted with a gel unloading device such as is achievable by air injection under pressure to provide for unloading of extremely viscous gel with high solids content.

In a particularly favoured embodiment according to the invention, gelatinization is performed in a sealed reactor, such as a 700 liter capacity reactor, fitted with a double jacket heating system supplied with steam from a 40 KW boiler. The stirring device is an anchor blade stirrer, driven by a 2.3 KW engine. The reactor is internally provided with a counteracting screw blade and is connected to a pressurized air inlet whereby pressure is raised in the chamber to assist in discharge operations.

The process in accordance with the invention consists more specifically of the following sequential steps:

introducing initially warm water at temperature of not more than 45° C. while stirring to avoid subsequent clump formation followed by:

adding flour in amounts as specified above, adding an alkaline agent diluted in water, such as sodium hydroxyde in an amount of from 0.3 to 0.6 g of sodium hydroxyde per Kg of flour, adding a divalent crosslinking agent, at a rate of from 0.1 to 0.3 g per Kg of flour in case of formalin or phthalic anhydride, at a rate of from 0.3 to 0.6 g per Kg of flour with respect to maleic anhydride, stirring the mixture at 0.5 Hz and heating the reactor at temperature in the range of 60 to 90° C. Upon reaching this temperature, stirring is continued so that the reaction can further proceed for a period of 15 to 30 minutes, adding optionally a biocidal agent to prevent bacterial or fungal contamination. Preferably, formalin is used as crosslinking agent. This can be either used in its free state in aqueous solution or in combination with bisulfite as commercially available or still in the form of formaldehyde/sodium sulfoxylate or a Schiff base, bound to aniline or methylamine, or still as a polymer such as metaldehyde or trioxane.

Following the crosslinking cycle, the reactor is discharged and the slurry is subjected to drying.

Drying is preferably carried out in an incubator under free or forced convection or inside a reactor where the gel can both be subjected to partial vacuum and drying under microwave energy. This extra energy input allows a sufficient temperature to be maintained deep into the gel (at least 70° to 75° C.) so that conversion of the gel into a vitreous or glass-like material can take place. Experience has shown that provided a sufficiently high microwave energy input is applied, optimal drying of the gel can be achieved in as short as 4 hours including time needed for gelatinization and that a sufficient temperature is maintained deep into the gel to cause vitreous fusion of grains.

Drying can also be conducted in an incubator or an oven at temperatures in excess of 100° C.; in which case drying is faster though crust formation might seriously occur, i.e. formation of two dry layers on either side of a still moist gel layer, the drying of which is uncertain due to the impervious nature of the lower and upper coat layers. The product according to the invention is usually in the form of a uniform solid phase, the color of which may vary according to the process actually used and more so with the drying procedure being employed as well as the type of raw material being selected. Shore hardness measurement conducted on calibrated test samples has shown a hardness value comprised between 70 and 85. The raw product is not used as such but is subject to grinding by means of an impeller breaker (cutter grinder) for instance.

Analysis of the raw product has shown dryness to range from 75 to 85% and preferably from 78 to 82% based on dry matter. Water activity ranges from 0.65 to 0.80 suggesting a fairly high free water content.

Care is taken to avoid an excessively dried product i.e. having a dryness over 85% as might result from overheating of the grinder. Such a product is too dry and accordingly too agressive for materials to be abraded.

When the product contains more moisture, i.e. when the dry solids content is notably less than 78%, the raw product is insufficiently rigid and too elastic, which fact might interfere with the grinding process.

Uniform moisture content and stabilization of the product greatly affect the hardness and the structure of the final product. The product has been pelletized following extrusion. Pellets must undergo tempering during several hours (14 hours for example to achieve a uniform bulk moisture content).

Grinding of the raw product is desirably conducted using a blade grinder. The sieving screen is calibrated according to the desired particle size. A 1 to 2 mm mesh screen is particularly well adapted. The ground product is subsequently sifted to achieve a uniform particle size distribution with the screen cutoff, lying suitably in the range of 0.2 to 0.25 mm.

Following grinding and sieving, the biological product according to the invention, is in the form of solid and translucent grains, showing no evidence of crystalline structure by X ray diffraction analysis. Transparency thereof as shown by microscopical inspection is excellent. Trace amounts of bran or even degraded protein were detected if at all as tiny black spots, as can be observed by microscopic examination. Residual water content is preferably higher than 12% without exceeding 20% and affects the product hardness.

A water content of about 15% is namely achieved by running three drying cycles in a OTW-150 equipement at 70–90° C. and two drying-cooling cycles with a DNTW equipement at 90–100° C.

The biological product according to the invention is slightly brown in color. This is a strong evidence of a Maillard reaction taking place. The hardness of the product as expressed in Mohs depends on dryness and ranges from 2 to 4 Mohs and is a function of the type of raw material being used and the drying process being selected. In general, biological products according to the invention obtained from spelt wheat flour have a higher hardness index (3–4 Mohs) with respect to those prepared from ordinary wheat flour (2–2.3 Mohs after drying in an incubator under forced convection). However, the Moh index reflecting hardness is difficult to measure and cannot merely be used to define abrasiveness of such a product.

There has been found a difference in quality of the final product after grinding for a given product subjected to tempering or not, on exit from the dryer. The product which was ground immediately after drying has a mat dusty appearance whereas the product that has undergone grinding 14 hours after tempering is glossy and has a uniform particle size distribution. Both factors listed herein affect the throughput of the grinder. After grinding, the product has been sieved with a plansichter MPAR so as to obtain two fractions:±>140 µm and ±<140 µm (−10%).

The biological product according to the invention has a coarse touch which is typical of its abrasiveness. The final product has no hygroscopic character nor any tendency to agglomerate under the influence of static electricity, provided care is taken to remove very fine particles (<0.23 µm). The biological product may have optionally added thereto a biocidal agent to prevent degradation thereof or development of molds.

The product according to the invention finds use as an abrasive grit mainly in high pressure dry jet processing. The product may be recovered and continously recycled for up to six times without loss in quality.

It can therefore be used in the aircraft industry for blasting aircraft cabins, for removing rubber gaskets of cabin windows under high pressure, or for stripping paint on <<fuselage>> framework under lower pressure, with excellent selectivity.

It can equally be used for blasting metallic or composite materials for the purpose of removing laquer and paint without causing dammage to the substrate.

It can further be used for cleaning of building exteriors mainly on building fronts, historical or religious monuments without harming moulding structures, carved work, architectural inclusions and ornaments.

It can still further be used for scouring floors such as concrete structures, glazed clay tiles or in restoration of walls (painted surfaces, slabstones, top coats).

The biological product of the invention is advantageous in that it is entirely biodegradable leaving no harmful or undesirable residue behind. Accordingly, it can subsequently be disposed or decomposed, leaving only few undesirable particles such as gum, tar, polymers, trace metallic elements which remain after digestion of the is biological product mainly by means of enzymatic products.

The biological product according to the invention has been found to be very versatile and thus suitable for a wide range of applications. It is possible to vary the jet pressure, the origin of raw materials and the processing method without substantially changing the properties of the final product.

Furthermore, the product thus obtained allows more savings in production costs than prior art products mainly derived from prepurified starches which are expected to be substantially more expensive.

The invention further relates to the use of biological products according to the invention as abrasive grit, either alone, or in suspension in a high pressure air jet directed against different types of substrate.

The invention relates in particular to the use of the biological product according to the invention as paint stripper or remover for aircraft cabins or car metal sheets, to remove residual paint without attacking the primer.

The invention is still concerned with the use of the biological product according to the invention as remover for either cladded or painted composite or metallic surfaces, for furniture or domestic electric appliances.

The invention is also directed to the use of suspensions of the biological product of the invention, optionally in combination with detergents, for cleaning building exteriors in particular those comprising carved works, moulding structures, architectural inclusions having an aesthetic or historical value.

The invention is further directed to the use of the biological product of the invention as scourer for floors, walls or ceilings, such as for example corridors and underground passageways.

For the present purposes, the biological product of the invention can be used either as such by projection techniques or in admixture at a concentration of 10 to 50% in a gas propellent such as compressed air for a period of 1 to 10 hours or a time sufficient to get a surface with no traces of prior coating or soils on building surfaces being cleaned.

The biological product of the invention finds equally use as a skin abrasive. A sweeping jet is continously applied on the skin to remove skin cells and perform a cleaning process referred to as peeling.

In view of the structure of the product, it is possible to grind it and sieve it until a particle size distribution of 100 to 200 μm is obtained with no loss in efficiency. Skin peeling applications are milder and performance is increased Prior to packaging, the product can be subject to dry sterilization with no loss in efficiency.

EXAMPLE I

Preparation of a Biological Product by Reaction of Wheat Flour with Formaldehyde There is used a stainless steel double jacket reactor which is supplied with hot steam and fitted with a closed loop cooling system.

The reactor is charged with distilled water having a temperature of less than 45° C. Wheat flour is weighed as well as other optional ingredients. Stirring is intially set at a rate of 50 RPM approx. and a preweighed amount of flour, sodium hydroxyde predissolved in 50 ml of distilled water and then a commercial formaldehyde solution and 0.25 g of sodium azide are added in succession.

The stirring speed is then adjusted to approx. 30 RPM whereupon heating is initiated valve temperature specification : 80° C. and boiler temperature specification :150° C.).

Upon reaching a temperature of 80° C., the gel is allowed to age at this temperature for 15 to 30 minutes.

The gel is then discharged from the reactor and arranged on prewarmed and preweighed incubator plates. The plates are weighed at regular time intervals to monitor the weight loss until the point where the required residual moisture content is reached.

The drying time decreases as the concentration of the gel is increased and the thickness thereof is reduced. When the gel has the proper consistency, the drying slurry is inverted in order to avoid crust formation which would otherwise slow down water evaporation.

All batches have been ground to 2 mm particle size. One single batch was only sieved. Three batches were prepared each having a different concentration of wheat flour. Flour concentrations were respectively 15, 25 and 30%. Significant differences in viscosity were found between different products either because of variable protein content or as a result of heat treatment. In fact, in order to bring the suspension and reactor to 80° C., the drying time is fairly long (2 hours approx.) However, as polysaccharide hydrolysis kinetics are slow, especially in the presence of a crosslinking agent, the prevailing factor responsible for viscosity characteristics is likely to be the type of flour used.

Two batches among the above contain the same additives (formalin in concentration of 0.15 g/Kg of flour, sodium hydroxyde at 0.4 g/Kg of flour). For an additional batch, maleic anhydride was used (at 0.4 g/Kg of flour, in the presence of sodium hydroxyde at 0.4 g/Kg of flour).

Two batches contained a biocidal agent ($N_3Na$) in an amount of 0.001 g/kg.

After drying, the following results were observed: The moisture content is variable.

| TEST n° | MOISTURE (%) | SHORE HARDNESS D | δ (HARDNESS)* | Aw |
|---|---|---|---|---|
| 1 | 22 | 73 | 4.13 | 0.458 |
| 2 | 17 | 66.3 | 4.32 | 0.491 |
| 3 | 20.8 | 73 | 4.15 | 0.543 |
| 4 | 21.2 | 56 | 6.2 | 0.339 |
| 5 | 16.7 | 73.5 | 4.96 | 0.537 |
| 6 | 16.4 | 68.4 | 5.06 | 0.475 |
| 7 | 17.2 | 70.8 | 6.12 | 0.562 |
| 8 | 16 | 77 | 5.2 | 0.596 |
| 9 | 18.3 | 76 | 4.3 | 0.521 |

Aw = water activity measurement

EXAMPLE II

Preparation of a Biological Product by Extrusion and Gelatinization

The desired product was readily obtained. Wheat flour was extruded, gelatinized in the form of non-expanded ropes of 2.5 mm in diameter and subsequently granulated. The bead-like pellets were then dried, ground and sieved.

Quality was consistent, when compared to the sample, for 4 industrial batches processed according to the following parameters:

moisture upon exit of the drying tunnel must be in the range of 15% the pellets must undergo tempering for several hours (14 hours during the tests) so that a homogeneous moisture content is achieved Homogeneous moisture content and tempering of product greatly affect the hardness and structure of the final product Provided both conditions are fulfilled, grinding can be readily achieved with an optimal flow speed.

A 15% moisture content was reached through three drying cycles:

one predrying run in OTW-150 at 70° to 90° C.

two drying-cooling runs in DNTW at 90–100° C.

It is not possible to dry the pellets at a temperature exceeding 100° C. since the product slightly begins to expand above 100° C.

Instrument and Processing Parameters

Extruder model DNDG-20 D with vented $4^{th}$ compartment

Die having 60 concentric holes of 2 mm in diameter

Granulator fitted with a double blade cutter

Maximal flow speed 175 Kg/hr.

The extrusion parameters for all four main test trials were

Moisture of raw material 13.7%

Moisture of final product (sample): 12.5%

EXAMPLE III

Rheological Investigation of Gels according to the Invention

1. Effect of Additives
A. Selection of Gelling Agent

As reported in the litterature, the crosslinking agent is usually combined with a base which acts as a primer in crosslinking reactions. The effect of this additive on rheological properties has been investigated. Viscosity was measured with the aid of a Rheomat Mettler RM 180 model Viscosimeter.

First, a blank (designated by—gel) was measured, i.e. a 15% additive-free starch gel suspension, which has been heated to 80° C. according to the procedure set out above. Plotted rheograms (FIGS. 1 and 2) were obtained for two samples : the first at $t_0$, i.e. at the point where gel temperature is 80° C., and the second at $t_{0+15}$ minutes. The rheogram obtained shows that the starch gel is a shear-thinning non Newtonian fluid (appended sheet I-1) with a threshold of about 1000 Pa.

The second test was conducted by merely adding sodium hydroxyde as additive (S-gel) using the same operating conditions.

The rheological behaviour of the gel changes with time (time-extended heat treatment) as set forth in the litterature. First curing cycle demonstrates a viscosity peak (gelatinization) which is followed by a gradual drop in viscosity due to partial hydrolysis of starch.

B. Effect of Sodium Hydroxyde

The effect of adding sodium hydroxyde in the presence of a crosslinking agent (epichlorhydrin being the one most currently used) was also investigated. It is observed that the reaction is catalyzed by sodium hydroxyde, as the shear stress of the SE gel (soda—epichlorhydrin) is slightly increased (these results are consistent with values report in the litterature).

Figure 1:
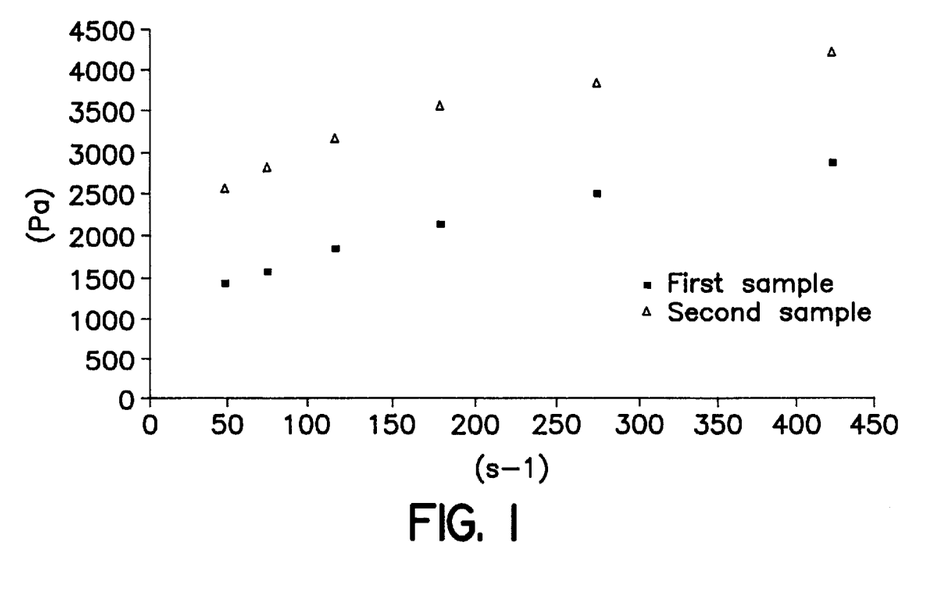
FIG. 1 to 4 are graphs of rheograms for gels of the invention as function of shearing stress.

FIG. 1 is a detailed depiction of the change in rheological behaviour of SE gel as a function of shearing stress given in Pa and of shearing rate given in $s^{-1}$ for two sequentially drawn samples.

The plots show that this process is accelerated in the presence of soda lye since viscosity increases within as few as 15 minutes (peak shown) while it remains stable for the—gel. In fact, sodium hydroxyde provides hydroxyl ions to the medium. These ions penetrate in the crystal lattice where they form hydrogen bonds with the starch molecule while destroying starch-starch bonds, thereby speeding up starch dissolution.

Figure 2:
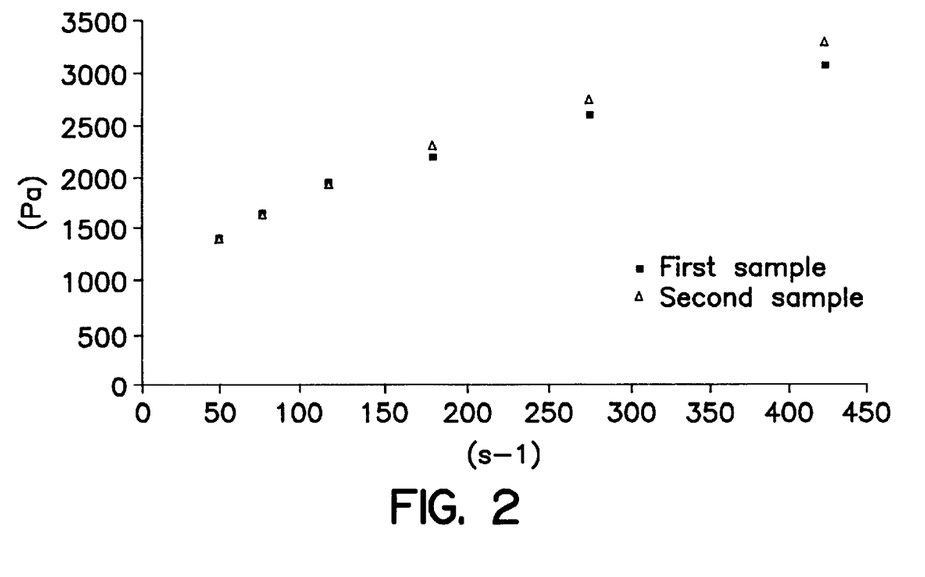

FIG. 2 is a detailed description of the change in rheological behaviour of the—gel as a function of shearing stress given in Pa and shearing rate given in $s^{-1}$ for two sequentially drawn samples.

Figure 3:
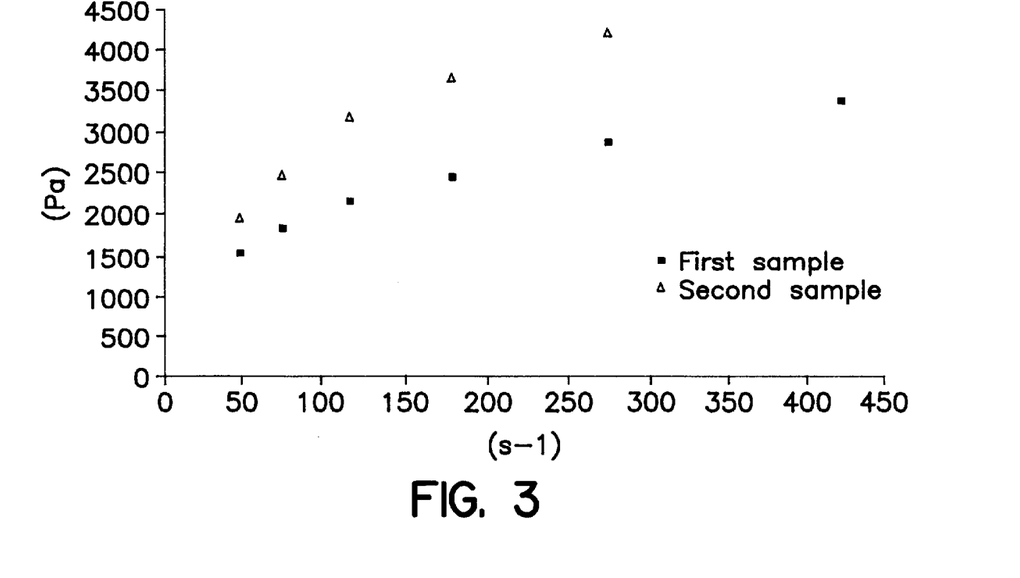
Figure 4:
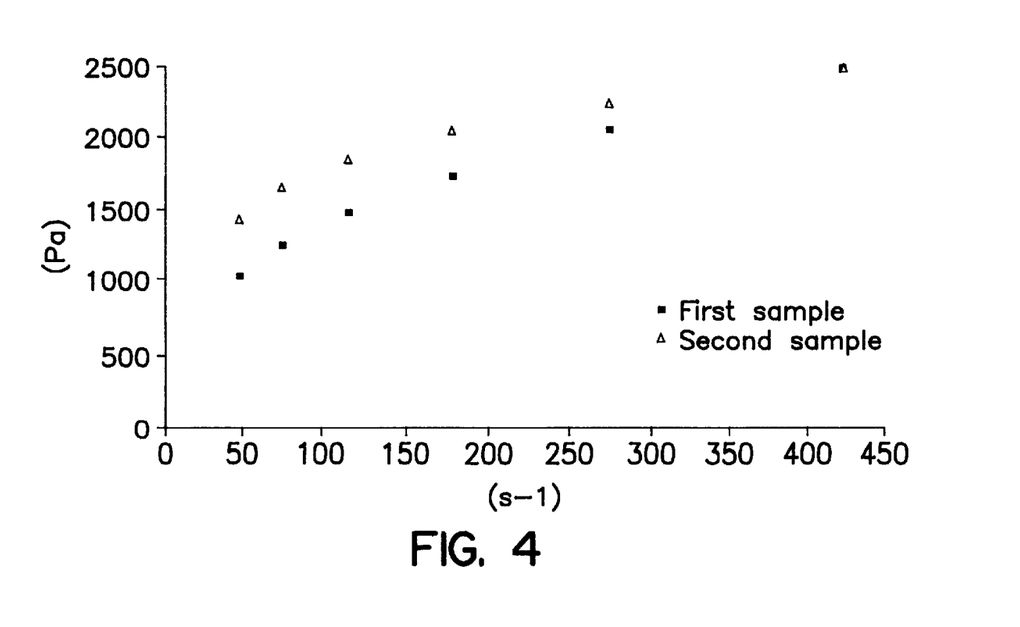

FIG. 3 describes in detail the change in rheological behaviour for S gel under the same operating conditions FIG. 4 demonstrates in detail the change in rheological behaviour of -E gel as a function of the shearing stress given in $s^{-1}$ for two sequentially drawn samples.

C. Selection of the Crosslinking Agent

The crosslinking agent generates linkages between starch chains by forming covalent bonds (stronger than hydrogen bonds), thereby consolidating the structure of the gel and increasing its resistance to extensive heat treatment. Given that crosslinking is characterized by an increase in gel viscosity with respect to the blank, different crosslinking agents were tested besides epichlorhydrin.

Gels were prepared in the same conditions as previously stated, with 0.4 g of sodium hydroxyde per Kg of flour and 0.4 g of crosslinking agent /Kg of flour being added (0.15 g/Kg in case of formalin).

Figure 5:
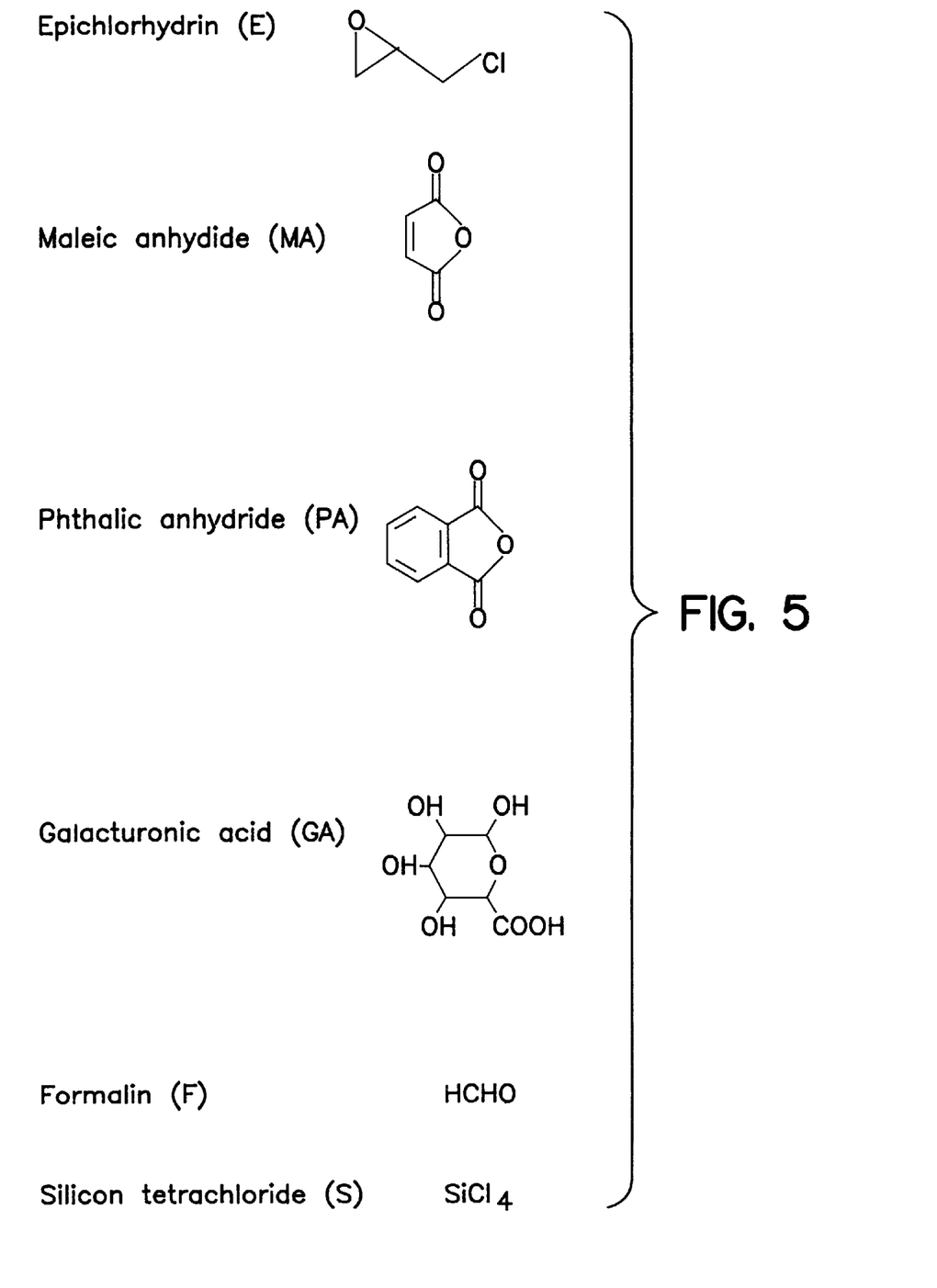
FIG. 5 illustrates the compounds tested.
Figure 6:
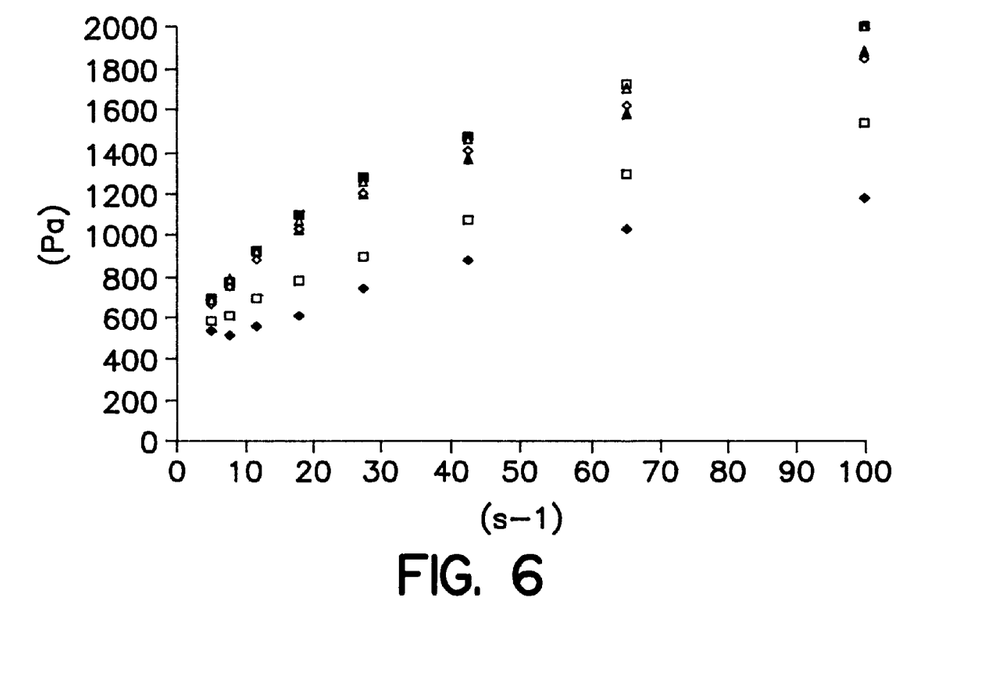
FIGS. 6 through 9 are graphs of the behavior of a series of gels of different crosslinking agents.
Figure 7:
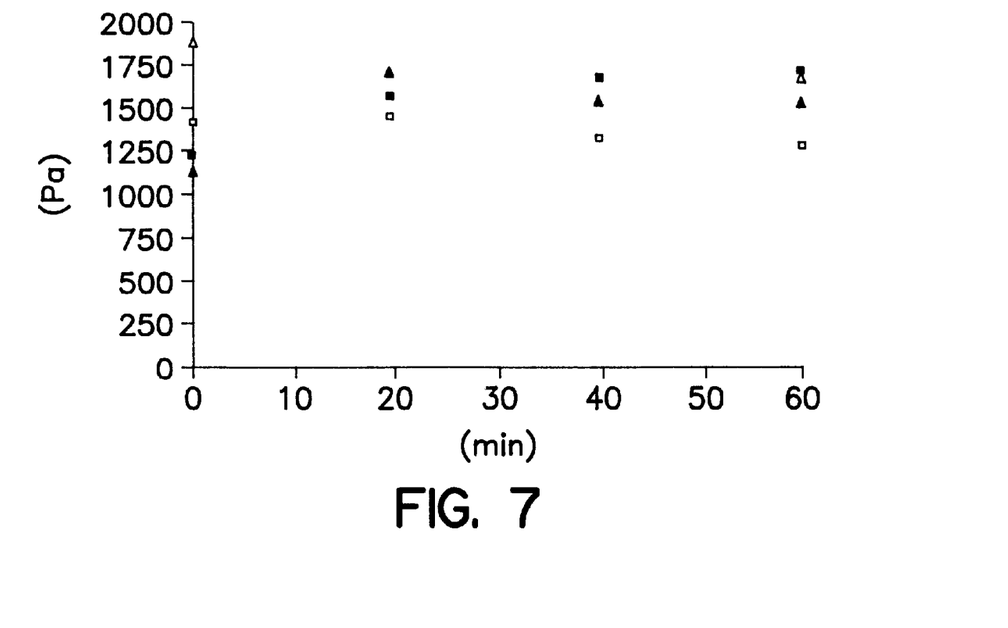

Compounds tested are shown on drawing sheet N° 5 given hereinafter:

Rheograms obtained with different gels are illustrated on FIGS. 6 and 7.

FIG. 6 depicts in detail the behaviour of a series of gels formed with the aid of distinct crosslinking agents ■=SAM gel □=SAP gel

▲=— —

○=SE gel

◇=SF gel

◆=SAG gel as a function of shear stress given in Pa and shear rate given in $s^{-1}$. Efficient crosslinking agents resulting in an increase in viscosity are most notably maleic anhydride and formalin.

Other assays were conducted to ascertain the effects of different additives (either in combination or not) as well as the effect of crosslinking agent concentration but using a different source of raw material.

FIG. 7 depicts the change in Theological behaviour of different gels at a shear rate of=100 $s^{-1}$ as a function of time in minutes for different gel types:

Δ=–gel

■=F gel

□=S gel and different SF gels.

These plots confirm previous observations. Addition of sodium hydroxyde speeds up gelatinization and hydrolysis. Consistency of formalin crosslinked gel is weaker than that of the—gel, but reversion occurs within almost 20 minutes. Indeed, the shear stress of the—control gel decreases while that of the formalin treated gel rises to reach a maximum within 40 minutes (initiation of hydrolysis at 60 minutes). This result may vary according to the type of raw material used.

Crosslinking (SF) gels is observed to exert a stabilizing effect which confers resistance to extensive heat treatment. Study of the effect of crosslinking agent concentration is interesting: as a general rule, viscosity of the gel drops as concentration is increased. Although unexpected, this finding fully agrees with the litterature.

2. Ageing Process

Upon hydrothermal treatment, flour sequentially goes through different stages, as reported in the litterature:

gelatinization: consists of swelling of the granules which stick one to the other. This phenomenon is reflected by an increase in viscosity of the suspension.

hydrolysis: if heat treatment is continued, granules will burst, as a result of partial hydrolysis of starch molecules. This is reflected by a drop in viscosity.

Accordingly, the rheological behaviour of the suspension (15% SE gel) was monitored in case of long term heat treatment in order to determine the time required for each phase.

Figure 8:
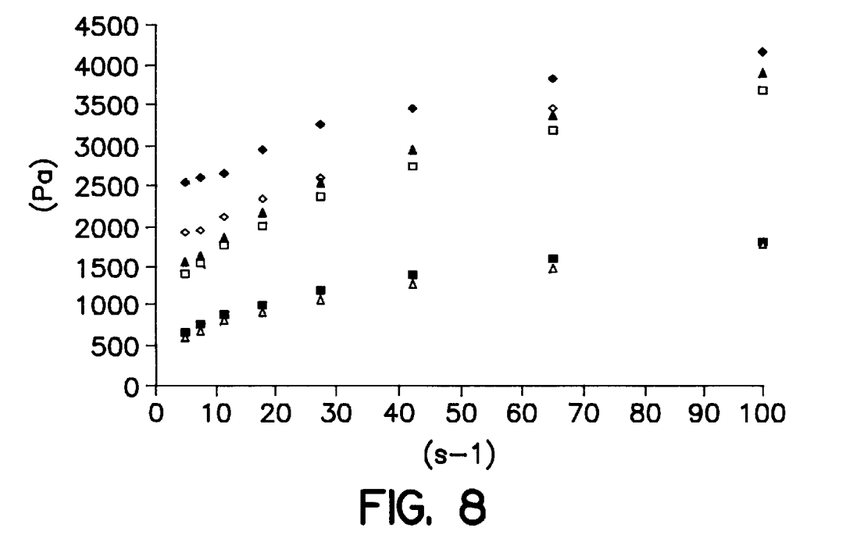

FIG. 8 depicts in detail the change in rheological behaviour of SF gel during long term heat treatment (at 80° C.) as a function of shear stress given in Pa and shear gradient given in $s^{-1}$.

Based on these rheograms, one can represent the time course change in minimal and maximal shear stress.

Figure 9:
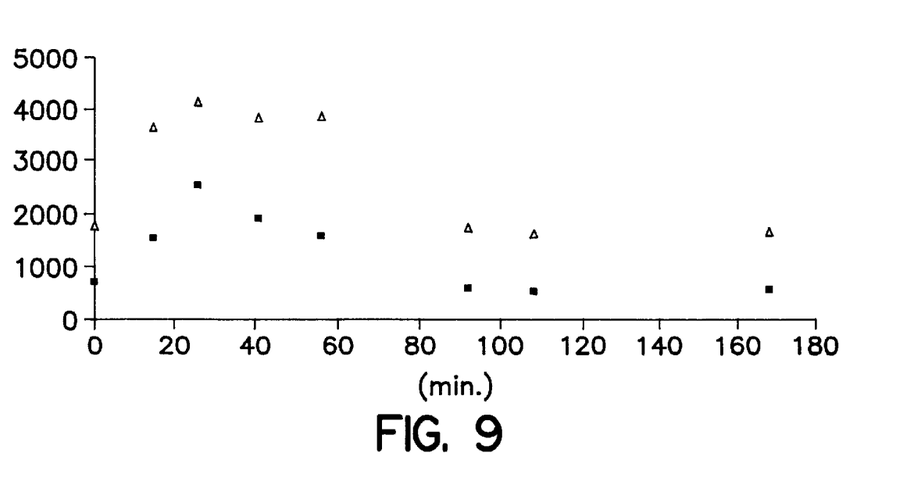

FIG. 9 is a schematic representation of the time course change in shear stress for SF gel as given in minutes under minimal shear stress (D = 7.67 $s^{-1}$) and
maximal shear stress (D = 100 $s^{-1}$)

The aforegoing results clearly demonstrate the existence of two stages. Shear stress increases during the initial twenty six minutes and thereafter gradually drops to reach a baseline within about ninety minutes.

What is claimed is:

1. A biological product having a vitreous structure, obtained as a result of polymerizing and crosslinking cereal flours in an alkaline medium with a divalent crosslinking agent, having a particle size distribution of between and 0.80 and 1.8 mm, a specific gravity in the range of 0.75 to 0.85 and a Shore index hardness in the range of 70 to 85.

2. Biological product according to claim 1, wherein the cereal flour is wheat flour.

3. Biological product according to claim 1, wherein the cereal flour is a fodder grade wheat flour.

4. Biological product according to claim 1, wherein the cereal flour is a spelt wheat flour.

5. Biological product according to claim 1, wherein the crosslinking agent is free-state formaldehyde, or formaldehyde which is in a chemically combined or polymerized form.

6. Biological product according to claim 1, wherein the crosslinking agent is maleic anhydride.

7. A process for producing a biological product of claim 1 comprising providing a cereal flour dispersion in an aqueous carrier at room temperature, forming by way of curing a gel made from cereal flour, a basic agent and a divalent crosslinking agent selected from the group of formaldehyde, and maleic anhydride, and then subjecting the resulting gel to additional ageing at a temperature in the range of 8 to 100° C. to obtain in the course of dehydration a solid structure, having a vitreous character and a water content of not more than 20% by weight followed by grinding into hard, slightly colored, translucent grains having a homogeneous particle size distribution.

8. A process in accordance with claim 7, wherein the basic agent is an alkali metal hydroxide.

9. A process in accordance with claim 7, wherein the basic agent is sodium hydroxide.

10. A process in accordance with claim 5 and claim 6, wherein the agent used in formalin treatment is a formaldehyde solution.

11. A process in accordance with claim 8, wherein the formaldehyde is included in an amount of between 0.1 and 0.3 g per Kg of flour.

12. A process in accordance with claim 7, wherein the maleic anhydride is included in an amount of 0.3 to 0.6 g/Kg.

13. A process in accordance with claim 7, wherein the time required for ageing is about 14 hours.

14. A process in accordance with anyone of claim 7, wherein crosslinking is carried out a temperature in the range of 60 to 100° C. for a time period of from 15 to 30 minutes.

15. A process in accordance with claim 7, wherein additional drying is conducted at a temperature of at least 70 to 75° C. by further heating using another oven.

16. A process in accordance with claim 15, wherein the product obtained as a result of additional drying has a dryness in the range of 75 to 85% based on dry matter.

17. A process in accordance with claim 16, wherein the product obtained as a result of additional drying has a dryness in the range of 78 to 82% based on dry matter.

18. A process in accordance with claim 15, wherein the product obtained as a result of additional drying has a Moh index hardness in the range of 2 to 4 Mohs, according to the type of raw material used.

19. A process in accordance with claim 7, wherein the dehydrated product is subjected in succession to grinding and sieving in order to obtain a product corresponding to a sieve cutoff in the range of 0.2 to 0.25 mm.

20. In a process for removing a coating from a substrate by blasting with particles by dry processing or suspension in a gas medium with an abrasive grit, the improvement comprising using as the abrasive grit, the biological product of claim 1.

21. The process of claim 20 wherein the product has a particle size distribution of 100 to 200 nm.

* * * * *